US012080132B2

(12) United States Patent
Topalian et al.

(10) Patent No.: US 12,080,132 B2
(45) Date of Patent: Sep. 3, 2024

(54) LOTTERY TICKET VENDING MACHINE

(71) Applicant: IGT Global Solutions Corporation, Providence, RI (US)

(72) Inventors: Medina Marie Topalian, East Greenwich, RI (US); Paul A. Bucci, Glocester, RI (US); Henry Constant, West Warwick, RI (US)

(73) Assignee: IGT Global Solutions Corporation, Providence, RI (US)

( * ) Notice: Subject to any disclaimer, the term of this patent is extended or adjusted under 35 U.S.C. 154(b) by 166 days.

(21) Appl. No.: 17/812,570

(22) Filed: Jul. 14, 2022

(65) Prior Publication Data

US 2024/0021054 A1 Jan. 18, 2024

(51) Int. Cl.
*G07F 17/32* (2006.01)
*B26F 3/00* (2006.01)

(52) U.S. Cl.
CPC ............ *G07F 17/329* (2013.01); *B26F 3/002* (2013.01)

(58) Field of Classification Search
CPC ........... G07F 17/329; G07F 17/32; B26F 3/00
See application file for complete search history.

(56) References Cited

U.S. PATENT DOCUMENTS

| | | | |
|---|---|---|---|
| 3,855,457 A | 12/1974 | Amundson et al. | |
| 5,222,624 A | 6/1993 | Burr | |
| 5,408,417 A | 4/1995 | Wilder | |
| 5,836,498 A | 11/1998 | Turek | |
| 6,609,644 B1 | 8/2003 | Menna | |
| 6,712,253 B2 | 3/2004 | Hargrave et al. | |
| 6,714,838 B2 | 3/2004 | Scrymgeour et al. | |
| 6,726,077 B2 | 4/2004 | Roberts et al. | |
| 7,032,774 B2 | 4/2006 | Boehm et al. | |
| 7,383,099 B2 | 6/2008 | Pollard et al. | |
| 7,562,798 B2 | 7/2009 | Bartolone et al. | |
| 7,665,394 B2 | 2/2010 | Roberts et al. | |
| 7,850,257 B2 | 12/2010 | Roberts et al. | |
| 8,127,973 B2 | 3/2012 | Mirkovic et al. | |
| 8,192,268 B1 | 6/2012 | Karpe | |
| 8,210,921 B1 | 7/2012 | Karpe | |
| 8,534,524 B2 | 9/2013 | Businger et al. | |
| 8,550,294 B2 * | 10/2013 | Martin .................. | G06Q 20/18 221/124 |

(Continued)

*Primary Examiner* — David L Lewis
*Assistant Examiner* — Robert E Mosser
(74) *Attorney, Agent, or Firm* — Neal, Gerber & Eisenberg LLP

(57) ABSTRACT

An instant lottery ticket vending machine including a machine housing, a ticket pack holder positioned in the machine housing and including a plurality of ticket pack drawers that are each configured to hold a pack of instant lottery tickets, a ticket receptacle supported by the machine housing, and a ticket burster positioned in the machine housing, wherein the ticket burster movable into a plurality of different ticket receipt positions respectively associated with and in alignment with a different one of the ticket pack drawers, wherein in each ticket receipt position, the ticket burster is configured to receive from the ticket pack drawer associated with that ticket receipt position an instant lottery ticket attached to a next instant lottery ticket, and wherein the ticket burster is configured to separate the instant lottery ticket from the next instant lottery ticket and dispense the instant lottery ticket into the ticket receptacle.

17 Claims, 11 Drawing Sheets

(56) References Cited

U.S. PATENT DOCUMENTS

| | | | |
|---|---|---|---|
| 9,613,337 B1 | 4/2017 | Garrison | |
| 9,685,026 B1 | 6/2017 | Garrison | |
| 10,438,452 B2 | 10/2019 | Ferron et al. | |
| 11,010,987 B2 | 5/2021 | Bucci | |
| 2003/0120381 A1 | 6/2003 | Perin et al. | |
| 2004/0000572 A1 | 1/2004 | Engelhardt, Jr. et al. | |
| 2005/0178810 A1 | 8/2005 | Woods et al. | |
| 2007/0017978 A1 | 1/2007 | Ho | |
| 2007/0088459 A1* | 4/2007 | Pollard | G07F 17/42<br>700/234 |
| 2010/0308071 A1 | 12/2010 | Businger | |
| 2014/0008407 A1 | 1/2014 | Bucci et al. | |
| 2016/0232741 A1 | 8/2016 | Assis et al. | |
| 2022/0108562 A1 | 4/2022 | Claude et al. | |
| 2022/0114842 A1 | 4/2022 | Mejenborg et al. | |
| 2022/0114860 A1* | 4/2022 | Mejenborg | B26F 3/02 |

* cited by examiner

LOTTERY TICKET VENDING MACHINE

BACKGROUND

The present disclosure relates to lottery ticket vending machines.

Instant lottery tickets may be printed on a long strip that may be fan-folded and provided in a pack of instant lottery tickets. Instant lottery tickets in such strips may be separated by perforations. Instant lottery tickets may vary in width and length. Instant lottery tickets may be sold from such packs using vending machines.

BRIEF SUMMARY

In various embodiments, the present disclosure relates to an instant lottery ticket vending machine including: a machine housing; a ticket pack holder positioned in the machine housing, the ticket pack holder including a plurality of ticket pack drawers, each of the ticket pack drawers configured to hold a pack of instant lottery tickets; a ticket receptacle supported by the machine housing; and a ticket burster positioned in the machine housing. The ticket burster is movable to a plurality of different ticket receipt positions. Each different ticket receipt position is associated with and in alignment with a different one of the ticket pack drawers. In each ticket receipt position, the ticket burster is configured to receive from the ticket pack drawer associated with that ticket receipt position an instant lottery ticket attached to a next instant lottery ticket, separate the instant lottery ticket from the next instant lottery ticket, and dispense the instant lottery ticket into the ticket receptacle.

In various other embodiments, the present disclosure relates to an instant lottery ticket vending machine including: a machine housing; a ticket pack holder positioned in the machine housing, the ticket pack holder including a plurality of ticket pack drawers, each of the ticket pack drawers configured to hold a pack of instant lottery tickets; and a ticket burster positioned in the machine housing. The ticket burster includes a burster housing that defines a ticket inlet, a ticket outlet, and a ticket movement path extending from the ticket inlet to the ticket outlet. The ticket burster is movable to a plurality of different ticket receipt positions. Each different ticket receipt position is associated with and in alignment with a different one of the ticket pack drawers. In each ticket receipt position, the ticket inlet of the burster housing is configured to receive from the ticket pack drawer associated with that ticket receipt position an instant lottery ticket that is attached to a next instant lottery ticket, and the ticket burster is configured to separate the instant lottery ticket from the next instant lottery ticket and dispense the instant lottery ticket through the ticket outlet.

In various other embodiments, the present disclosure relates to an instant lottery ticket vending machine including: a machine housing; a ticket pack holder positioned in the machine housing, the ticket pack holder including a plurality of ticket pack drawers, each of the ticket pack drawers configured to hold a pack of instant lottery tickets; and a ticket burster positioned in the machine housing. The ticket burster includes a burster housing that defines a code reader scan area. The ticket burster is movable to a plurality of different ticket receipt positions. Each different ticket receipt position is associated with and in alignment with a different one of the ticket pack drawers. In each ticket receipt position, the burster housing is configured to receive from the ticket pack drawer associated with that ticket receipt position an instant lottery ticket that is attached to a next instant lottery ticket. The ticket burster includes a code reader configured to emit light waves to read a code on each instant lottery ticket as that instant lottery ticket moves through the code reader scan area. The ticket burster is also configured to separate the instant lottery ticket from the next instant lottery ticket and dispense the instant lottery ticket through the ticket outlet.

Additional features are described in, and will be apparent from, the following Detailed Description and the figures.

DETAILED DESCRIPTION

Figure 1:
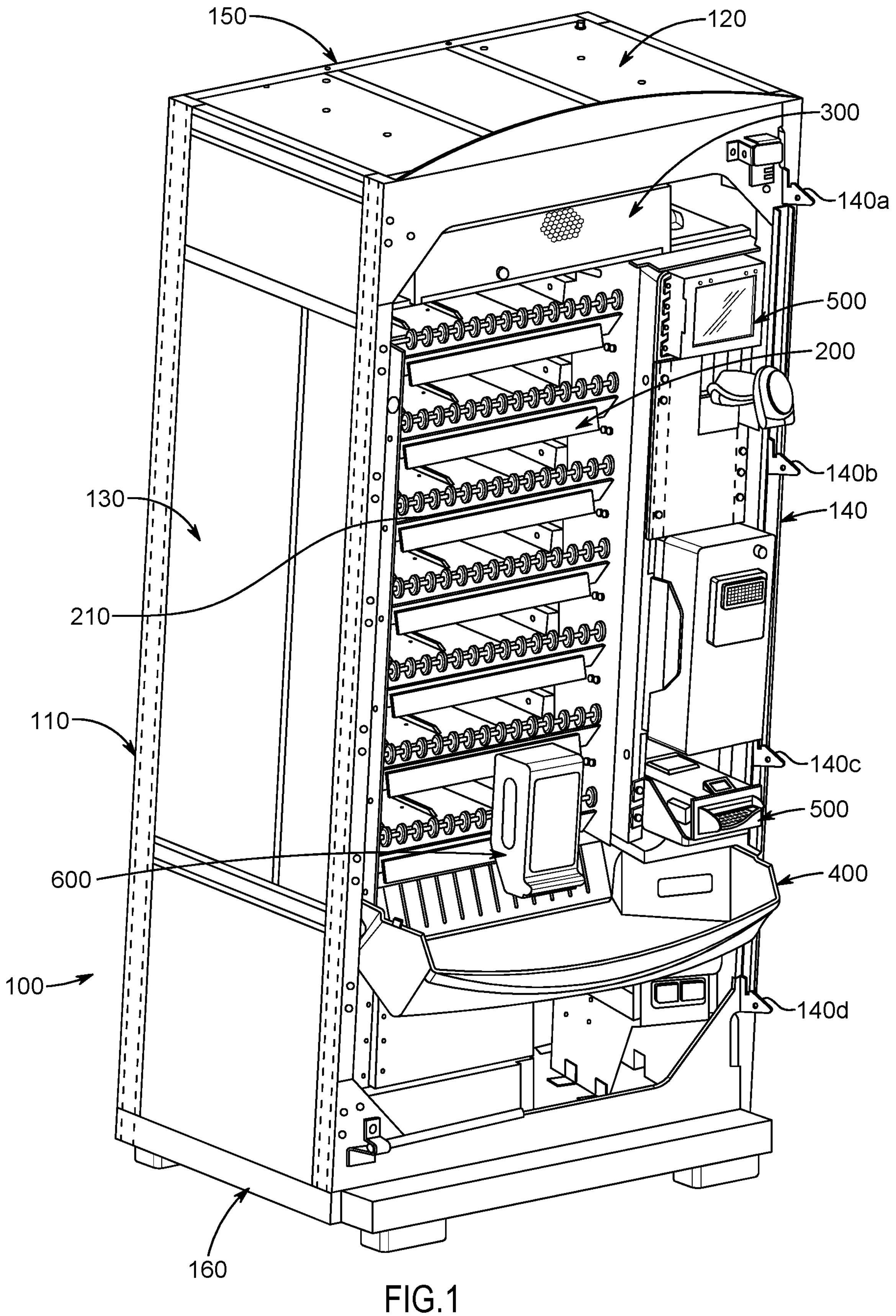
FIG. 1 is a front perspective view of an instant lottery ticket vending machine of one example embodiment of the present disclosure shown with a front door and a ticket burster support removed, and showing a movable ticket burster of the instant lottery ticket vending machine.
Figure 2:
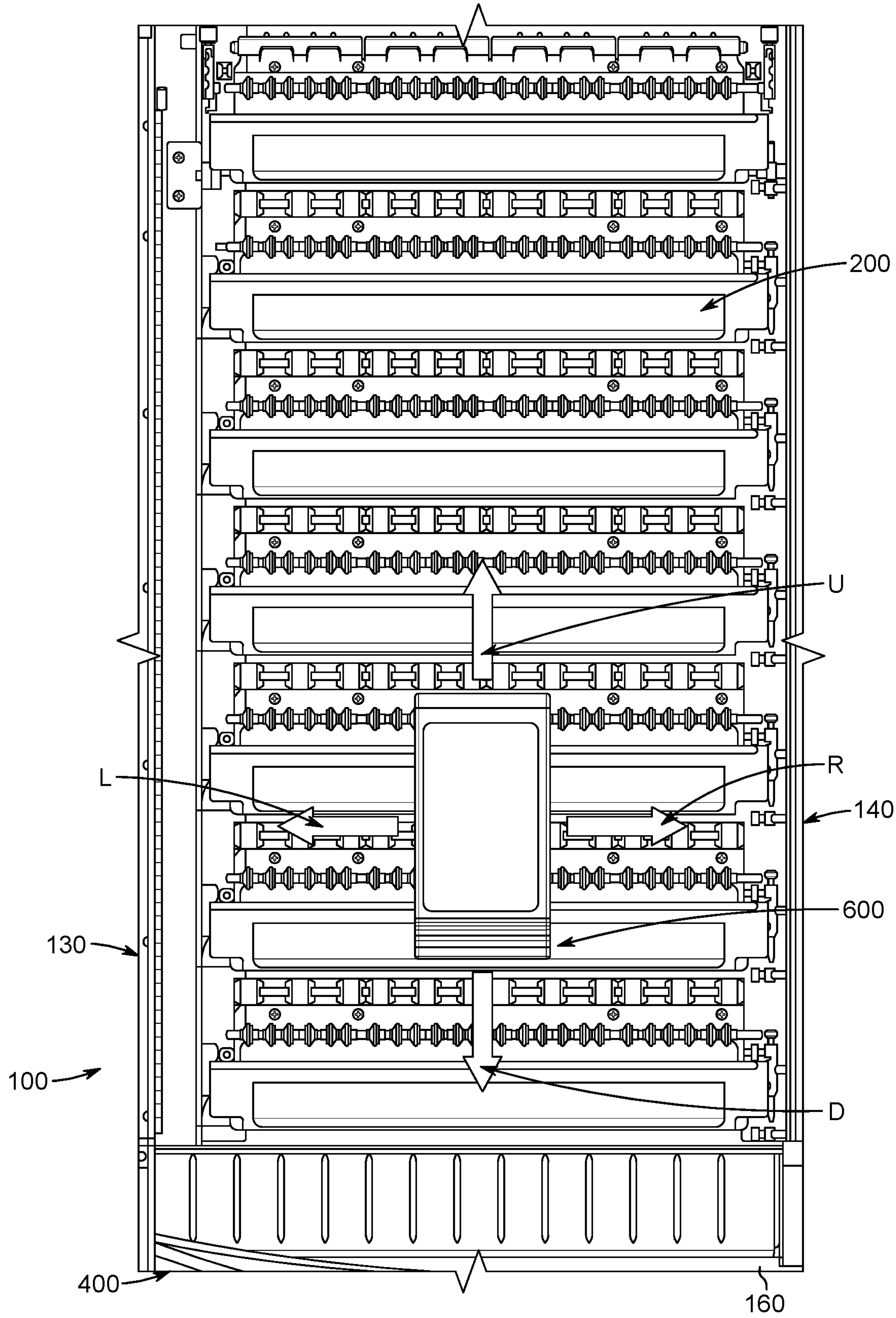
FIG. 2 is a fragmentary front view of part of the instant lottery ticket vending machine of FIG. 1 shown with the front door and the ticket burster support removed, and showing the movable ticket burster of this example instant lottery ticket vending machine.
Figure 3:
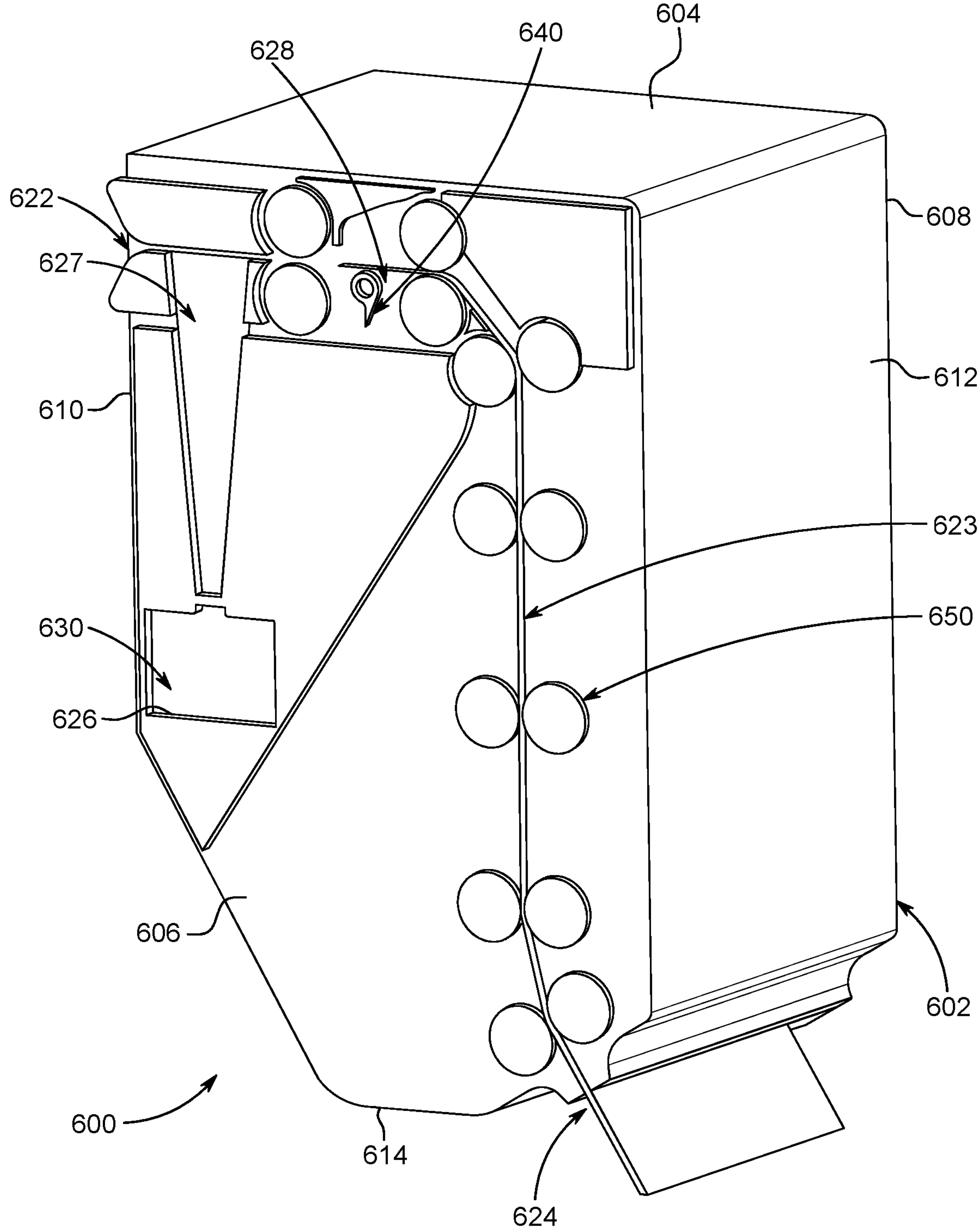
FIG. 3 is an enlarged side perspective view of the movable ticket burster of the instant lottery ticket vending machine of FIG. 1.
Figure 4:
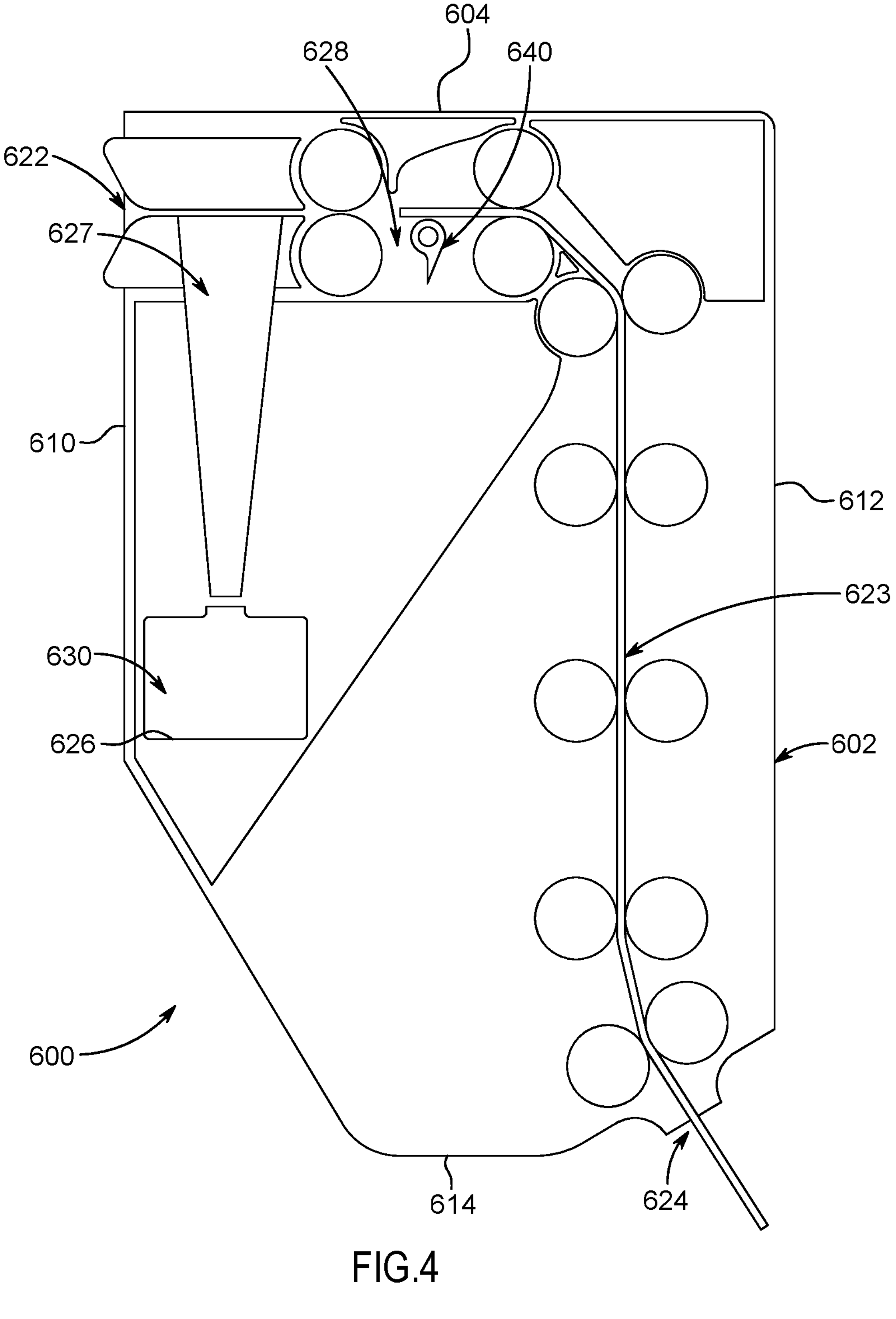
FIG. 4 is an enlarged side view of the movable ticket burster of the instant lottery ticket vending machine of FIG. 1.

In various embodiments, the present disclosure relates to an instant lottery ticket vending machine that includes: (a) a ticket pack holder configured to hold a plurality of different types of instant lottery tickets; and (b) a movable ticket burster configured to, for each different type of instant lottery ticket requested by one or more purchasers, move into a ticket receipt position to receive the next instant lottery ticket of that type held by the ticket pack holder, receive that next instant lottery ticket from the ticket pack holder, read a code (such as a compact image sensor or a barcode) of that instant lottery ticket, separate that instant lottery ticket from the pack, move to a ticket dispense position adjacent to a ticket receptacle (if necessary), and dispense that instant lottery ticket in the ticket receptacle for access by such purchaser.

For a better understanding of the present disclosure, examples instant lottery tickets are first generally described herein.

Various known instant lottery tickets are single game instant lottery tickets. An example single game instant lottery ticket can include: (1) a ticket substrate have a front surface and a back surface; (2) a predefined scratch-off area on the front surface; (3) variable lottery game indicia printed on the predefined scratch-off area; (4) a scratch-off coating ("SOC") covering the variable lottery game indicia and the predefined scratch-off area; and (5) variable instant lottery ticket information indicia printed on the back surface. The instant lottery ticket information indicia can include text, one or more ticket numbers, one or more ticket codes (such as barcodes), and other instant lottery ticket information that is in human readable and machine readable forms. Certain of this instant lottery ticket information: (a) identifies the instant lottery ticket; (b) the set, run, and/or pack of instant lottery tickets that the instant lottery ticket is part of; and (c) other inventory control information. Various known single game instant lottery tickets include multiple predefined scratch-off areas, multiple sets of variable lottery game indicia printed on the predefined scratch-off areas, and multiple SOCs covering the variable lottery game indicia sets. Various known instant lottery tickets are multi-game instant lottery tickets and can be larger than single game tickets. Instant lottery tickets can also be of the known pull tab type. Instant lottery tickets can have a width that varies from 2 to 4 inches and a length that varies from 2 to 12 inches. The term instant lottery ticket as used herein is intended to cover these various different types and other types of lottery tickets that can be dispensed in a same or similar manner as these types of lottery tickets.

Various instant lottery tickets are often arranged after manufacture (which includes after complete printing) in instant lottery ticket packs for storage, organization, sorting, picking, shipping to instant lottery ticket distributors or ticket retailers, and validation. Instant lottery ticket packs can include a plurality of instant lottery tickets (that are all of the same type, same size, and for the same game(s), and can be protected for storage and shipping by a transparent pack wrapping, such as transparent plastic wrapping, securely wrapped around the plurality of instant lottery tickets. A pack of instant lottery tickets can include all of the instant lottery tickets attached to each other but separated by perforations. Such instant lottery tickets of a pack can be detached from each other along such perforations. While tickets of each pack are often manufactured in a continuous strip that is fan-folded for convenient supply, the packs can be in other forms such as in a roll form. These packs in the fan-folded form or in the roll form are configured to dispensing via an instant lottery ticket vending machine.

Turning now to FIGS. 1, 2, 3, and 4, an instant lottery ticket vending machine of one example embodiment of the present disclosure is generally illustrated and indicated by numeral 100. The instant lottery ticket vending machine 100 may be referred to herein as the ticket vending machine for brevity. The ticket vending machine 100 includes: (a) a machine housing 110; (b) a ticket pack holder 200 positioned in and supported by the machine housing 110; (c) various electronic components (not shown) some of which are contained in an electronic component holder 300 positioned in and supported by the machine housing 110; (d) a ticket receptacle 400 positioned in and supported by the machine housing 110; (e) various purchaser interface components 500 (not individually labeled) positioned in and supported by the machine housing 110; and (f) a movable ticket burster 600 positioned in the machine housing 110 and supported by a burster supporter (not shown) positioned in and supported by the machine housing 110. It should be appreciated that the ticket vending machine 100 will include various other components that are conventional in the industry and/or that would be readily apparent to those of ordinary skill in the art, but that are not described herein for brevity.

More specifically, the machine housing 110 includes a top wall 120, spaced-apart side walls 130 and 140, a rear wall 150, a base 160, and openable front door (not shown) connected to one of the side walls 130 or 140 (and specifically side wall 140 in this example. The base 160 is configured to rest on a floor or other suitable support. The machine housing 110 includes one or more supports (not shown) configured to hold and support the ticket pack holder 200. The front door is moveable from a closed and locked position covering the open front face of the machine housing 110 to an open position allowing access to the interior of the machine housing 110. The front door can be mounted on brackets attached to one of the side walls of the machine housing 110 (such as such as brackets 140*a*, 140*b*, 140*c*, and 140*d* attached to side wall 140 in this example). A suitable locking mechanism (not shown) can be mounted on the front door and the respective side wall 130 or 140 of the machine housing 110 to facilitate locking of the front door in the closed position. When the front door is in the closed and locked, the interior of the machine housing 110 is generally secured so as to be inaccessible except by an authorized person. The front door can includes one or more areas for any components supported by the front door and/or that are contained in and/or protected by the structure of the front door. The front door can include one or more openings such as for a glass panel that enables people to see into the machine housing 110 and for one or more of the purchaser interface components (such as those described below).

The ticket pack holder 200 includes a series of ticket pack drawers 210 (not individually labeled) that are arranged in a plurality of rows. Each of the ticket pack drawers 210 is configured to hold one or more packs of instant lottery tickets for subsequent dispensing by the ticket vending machine 100. The ticket pack drawers 210 can vary in quantity, size, and shape depending upon the particular size of the ticket vending machine 100 and the quantity, size, and shapes of the instant lottery tickets that the ticket vending machine 100 can or will dispense. Each ticket pack drawer 210 is configured to hold instant lottery tickets for selection by the purchasers. In various embodiments, each ticket pack drawer 210 can hold instant lottery ticket packs for different lottery games, but it should be appreciated, that two or more ticket pack drawers 210 can hold the same types of instant lottery tickets. In various embodiments, each of the ticket pack drawers 210 is configured to feed each instant lottery ticket held by that ticket pack drawer 210 into the ticket burster 600 when the ticket burster 600 is moved into alignment with such ticket pack drawer 210 for receipt, code reading, bursting, and dispensing of that instant lottery ticket, as further explained below. Thus, in such embodiments, the ticket pack drawers 210 do not burst the instant lottery tickets and do not need any mechanisms for busting the instant lottery tickets.

The electronic component holder 300 contains various electronic components (not shown) for the ticket vending machine 110. Such electronic components can be arranged in any suitable manner. The electronic component holder 300 can be in the form or a slide-out drawer to facilitate access to the various electronic components contained therein. The electronic components can form part of the control system for the ticket vending machine 100. Various electronic components can also be positioned in the machine housing 110 outside of the electrical component holder 300. The electronic components can include one or more controllers that control(s) the operation of the ticket vending machine 100 including the movable ticket burster 600 as further discussed below to facilitate the dispensing of each requested instant lottery ticket. The controller(s) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) stores instructions executable by the processing device(s) to control operation of the ticket vending machine 100.

The ticket receptacle 400 is configured to receive each instant lottery ticket from the movable ticket burster 600 after the movable ticket burster 600 obtains such ticket from the respective ticket pack drawer 210. In certain embodiments, the ticket burster 600 can dispense instant lottery tickets into the ticket receptacle from any of the ticket receipt positions of the ticket burster. In other embodiments, the ticket burster moves to a suitable ticket dispense position adjacent to (such as above or slightly above) the ticket receptacle 400 to dispense each instant lottery ticket into the ticket receptacle 400. The ticket receptacle 400 is configured to receive and hold each instant lottery ticket received from the movable ticket burster 600 and enable the respective purchaser to retrieve the dispensed instant lottery ticket from the ticket receptacle 400.

The purchaser interface components 500 include one or more display devices, one or more input devices, and one or more payment acceptors. The purchaser interface components 500 enable purchasers to use such components to determine the instant lottery tickets available from the ticket vending machine 100, and to select and pay for any of those instant lottery tickets held by the ticket vending machine 100 that the purchaser desires to obtain. The purchaser interface components 500 can display images and information to inform purchasers of the different instant lottery tickets available from the ticket vending machine 100 and to assist in completing the selection and purchase of such instant lottery tickets. These purchaser interface components 500 can take many different forms as well known in the industry, and are thus not described herein for brevity.

The movable ticket burster 600 is supported by a burster supporter (not shown). The burster supporter can be any suitable structure that supports the ticket burster 600 and enables the ticket burster 600 to move to any of the different ticket receipt positions that are associated with and in alignment with the different respective ticket pack drawers 210, and the ticket receptacle 400 if needed. For example, the ticket burster supporter can includes a suitable XY gantry that supports the ticket burster 600 and enables the ticket buster 600 to move to any of these respective ticket receipt positions. The ticket vending machine 100 also includes one or more actuators (not shown) that control movement of the ticket burster 600 under control of the controller of the ticket vending machine 100. These actuators can be mounted on the burster supporter and/or the ticket burster 600 itself. The actuators are configured to move the ticket burster 600 under the control of the controller in both the horizontal (e.g., left and right) directions and the vertical (e.g., up and down) directions as generally indicated by the arrows L, R, U, and D in FIG. 2. The movable ticket burster 600 is thus moveable, via these actuators, on the ticket burster supporter to different locations including a plurality of the locations respectively associated and aligned with each of the ticket pack holders 210 such that the ticket burster 600 is positioned to receive one or more of the instant lottery tickets stored in each respective ticket pack drawer 210 for dispensing that instant lottery ticket into the ticket receptacle 400 for the purchaser as requested by the purchaser.

The example movable ticket burster 600 generally includes: (a) a burster housing 602; (b) one or more burster supporter connecters (not shown) connecting the burster housing 602 to the burster supporter; (c) a code reader 630 (such as a compact image sensor or a barcode reader) supported by the burster housing 602; (d) a ticket cutter 640 supported by the burster housing 602; (e) a plurality of ticket engagers 650 supported by the burster housing 602; and (f) a burster controller (not shown).

More specifically, the burster housing 602 generally includes a top member 604, spaced-apart side members 606 and 608, an inner member 610, an outer member 612, and a bottom member 614. The burster housing 602 also includes a plurality of internal members (not individually labeled) that define a ticket inlet 622 through which the ticket burster 600 is configured to receive an instant lottery ticket from a ticket pack drawer 210, a ticket outlet 624 through which the ticket burster 600 is configured to dispense the received instant lottery ticket into the ticket receptacle 400, and a ticket movement path 623 extending from the ticket inlet 622 to the ticket outlet 624 and through which the instant lottery ticket is moved through the ticket burster 600. The burster housing 602 and particularly the inner member 610 thereof can define an opening for or part of the ticket inlet 622. The burster housing 602 and particularly the bottom member 614 thereof can define an opening for or part of the ticket outlet 624. The burster housing 602 and particularly the internal members thereof also define: (1) a code reader support area 626 configured to receive and support the code reader 630; (2) a code reader scan area 627 that provides space for the light waves of the code reader 630 (such as a barcode) to reach the code (such as a barcode) on each instant lottery ticket that moves through the ticket burster 600; (3) a cutter support area 628 configured to receive and support the ticket cutter 640 (and any actuators thereof); (4) a plurality of ticket engager support areas (not labeled) configured to receive and support the respective ticket engagers 650 (and any actuators thereof); and (5) a burster controller area (not shown or labeled) configured to receive and support the burster controller.

The ticket burster 600 includes one or more burster supporter connecters (not shown) that facilitate the connection of the burster housing 602 to the burster supporter such that the burster housing 602 can move relative to the burster supporter.

The code reader 630 (such as a compact image sensor or a barcode reader) is configured to be positioned in the burster housing 602 and specifically in the code reader support area 626. The code reader 630 is configured to emit light waves to read the respective code (such as a barcode) on the back side of each instant lottery ticket as that ticket moves in the ticket movement path 623 and through the top of the code reader scan area 627. The code reader 630 is configured to communicate with the burster controller to provide code scan data to the burster controller. The burster controller is configured to communicate that data to the controller of the ticket vending machine 100.

The ticket cutter 640 is configured to be positioned in the burster housing 602 and specifically in the cutter support area 628. The ticket cutter 640 is configured to rotate to cut each instant lottery ticket that moves along the ticket movement path 623 from the next instant lottery ticket of the continuous strip of instant lottery tickets received from the respective ticket pack drawer 210. The ticket cutter 640 is configured to make such cut along the perforations between the two connected instant lottery tickets of such strip. The ticket cutter 640 is controlled by the burster controller and/or the controller of the ticket vending machine 100. In this example embodiment, the ticket cutter 640 is inwardly positioned (i.e., positioned downstream) from the ticket inlet 622. After the ticket cutter 640 cuts the last instant lottery ticket requested by the purchaser from the respective ticket pack drawer 210, the ticket pack drawer 210 can retract any portion of the next instant lottery ticket from the ticket burster 600 before the ticket burster 600 moves from a ticket receipt position aligned with that ticket pack drawer 210. In other embodiments, the ticket burster 600 can be configured such that the ticket cutter is positioned closer to or on the other side of the ticket inlet (i.e., positioned upstream of the ticket inlet) such that after the ticket cutter cuts the instant lottery ticket along the perforations connecting two instant lottery tickets, the ticket pack drawer 210 may not need to withdraw the next instant lottery ticket in the strip or may only need to withdraw the next instant lottery ticket in the strip a relatively small amount.

In other embodiments, the ticket burster 600 can be configured such that the burster housing 602 is rotatable about a horizontal axis to separate (via a tearing and/or twisting motion) each instant lottery ticket along the perforations connecting that instant lottery ticket to the next instant lottery ticket in the strip. In such embodiments, the ticket pack drawer 210 may not need to withdraw the next instant lottery ticket of the strip or may only need to withdraw the next instant lottery ticket of the strip a relatively small amount. In such embodiments, the ticket burster may not need a ticket cutter.

It should be appreciated that the ticket burster 600 is thus configured to burst the perforations between the instant lottery ticket being dispensed and the next instant lottery ticket of the strip so as to enable the dispensed instant lottery ticket to be dispensed into the ticket receptacle 400. This prevents a person from improperly tearing an instant lottery ticket or being able to pull an extended number of instant lottery tickets from one of the ticket packs. It should be appreciated that the ticket burster 600 can be moved to a dispensing location for each instant lottery ticket dispensed, or for only certain of the lottery tickets dispensed. It should also be appreciated that the ticket burster can moved to a different location for any instant lottery ticket that is deemed to be bad or non-dispensable for any reason, and to deposit that ticket into a suitable rejection area.

It should be appreciated that an instant ticket vending machine of the present disclosure can have more than one ticket burster 600 such that can operate at the same time, or such that one or more ticket burster are back-ups in case there is an issue with the main ticket burster. These additional ticket burster(s) can be employed automatically or manually.

The ticket engagers 650 include multiple driven rollers (not labeled) and multiple guide rollers (not labeled). The driven rollers are rotated by suitable actuators (not shown) under the control of the burster controller or the controller of the ticket vending machine 100. The driven rollers and the guide rollers are configured to move (such as by pulling) and guide each instant lottery ticket along the ticket movement path 623 and out of the ticket outlet 624. In alternative embodiments, the ticket engagers are configured to grip and pull each instant lottery ticket from the respective ticket pack drawer 210.

The burster controller (not shown) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) stores instructions executable by the processing device(s) to control operation of the ticket burster 600. The burster controller can be hard wired or wirelessly connected to and in communication with the code reader 630, the cutter 640, the actuators for the driven rollers, and any actuators on the ticket burster 600 that cause the movement of the ticket burster 600. In such embodiments, the burster controller can be wirelessly connected to and in communication with the controller of the ticket vending machine 100. In other embodiments, the ticket burster does not include a controller and is completely controlled by the controller of the ticket vending machine 100. In such embodiments, the controller of the ticket vending machine 100 can be wirelessly connected to and in communication with the code reader 630, the cutter 640, the actuators for the driven rollers, and any actuators on the ticket burster 600 or the buster supporter that cause the movement of the ticket burster 600.

Example methods of operation of the ticket vending machine 100 are now described. It should be appreciated that the following examples are not an exhaustive list of the different method of operations of the ticket vending machine 100 and are thus not to be limiting of the scope of the present disclosure. It should also be appreciated that the operations are controlled by the controller of the ticket vending machine and/or the controller of the ticket burster, and that the descriptions provided below of the steps are controlled by such controllers.

The first example is when a purchaser desires to purchase a single instant lottery ticket from the ticket vending machine 100. Responsive to and after the purchaser selects the instant lottery ticket (from the plurality of different instant lottery tickets available from the ticket vending machine 100) using the purchaser interface components 500 and specifically using one or more of the input devices and one or more of the payment acceptors to select and pay for the instant lottery ticket, the ticket vending machine 100 cause the ticket burster 600 to obtain and dispense that instant lottery ticket into the ticket receptacle 400. This includes: (1) moving the ticket burster 600 into a ticket receipt position associated with and in alignment with the ticket pack drawer 200 that holds the instant lottery ticket pack of the selected type of instant lottery ticket requested by the purchaser; (2) causing the ticket pack drawer 200 to feed a leading edge of the top or front most instant lottery ticket of that pack in that ticket pack drawer 200 into the ticket inlet 622 of the ticket burster 600 (with the front face of the instant lottery ticket facing upwardly); (3) causing the ticket engagers 650 to engage and cause that instant lottery ticket to move along the ticket movement path 623; (4) at the appropriate time when the code (such as a barcode) on the back face of that instant lottery ticket passes through the top of the code reader scan area 627, causing the code reader 630 (such as a compact image sensor or a barcode reader) to read the code (such as a barcode) of that instant lottery ticket, and sending code data to the burster controller and/or the controller of the ticket vending machine 100; (5) at the appropriate time when the perforations connecting that instant lottery ticket to the next instant lottery ticket of that strip are aligned with the ticket cutter 640 causing ticket cutter 640 to cut the perforations instant and thus separate that instant lottery ticket from the next instant lottery ticket in the strip; (6) casing the ticket pack drawer 210 to retract any portion of that next instant lottery ticket of the strip from the ticket burster 600; and (7) causing the ticket engagers 650 to move the separated instant lottery ticket along the ticket movement path 623, to and out of the ticket outlet 624 and into the ticket receptacle 400. Certain embodiments include moving the ticket burster 600 adjacent to the ticket receptacle 400 to dispense the separated ticket into the ticket receptacle 400. The method includes the controller of the ticket vending machine 100 also sending the code data for the dispensed instant lottery ticket to a central lottery server (not shown) for verification of that instant lottery ticket for possible subsequent redemption.

The second example is when a purchaser desires to purchase multiple instant lottery tickets of the same type from the ticket vending machine 100. This example includes the same steps as in the first example, except that in this example, the ticket pack drawer 210 does not retract next instant lottery ticket of the strip from the ticket burster 600 until all of the purchased tickets have been separated. In an alternative embodiment of this method, the ticket cutter 640 only makes one cut and leaves all of the tickets purchased by the purchaser attached.

The third example is when a purchaser desires to at least two instant lottery tickets of different type from the ticket vending machine 100. This example includes the same steps as in the first example for each different type of single instant lottery ticket purchased and the same steps as the second example for each different type of multiple instant lottery tickets purchased.

In various embodiments, the controller of the ticket vending machine can maintain data regarding the length of each instant lottery ticket from its leading edge to the trailing edge so the controller knows when to cause the ticket cutter to be activated to separate connected ticket along the perforation. In various embodiments, the ticket vending machine can include one or more sensors for providing or verifying this information.

It should thus be appreciated that the movable ticket burster of the present disclosure can replace the multiple stationary dispensing devices that are respectively mounted in front of each of the respective ticket drawers in various known instant lottery ticket vending machines. It should also be appreciated that by eliminating the multiple stationary dispensing devices, a greater quantity of ticket pack drawers can be employed than in various known instant lottery ticket vending machines.

Figure 5:
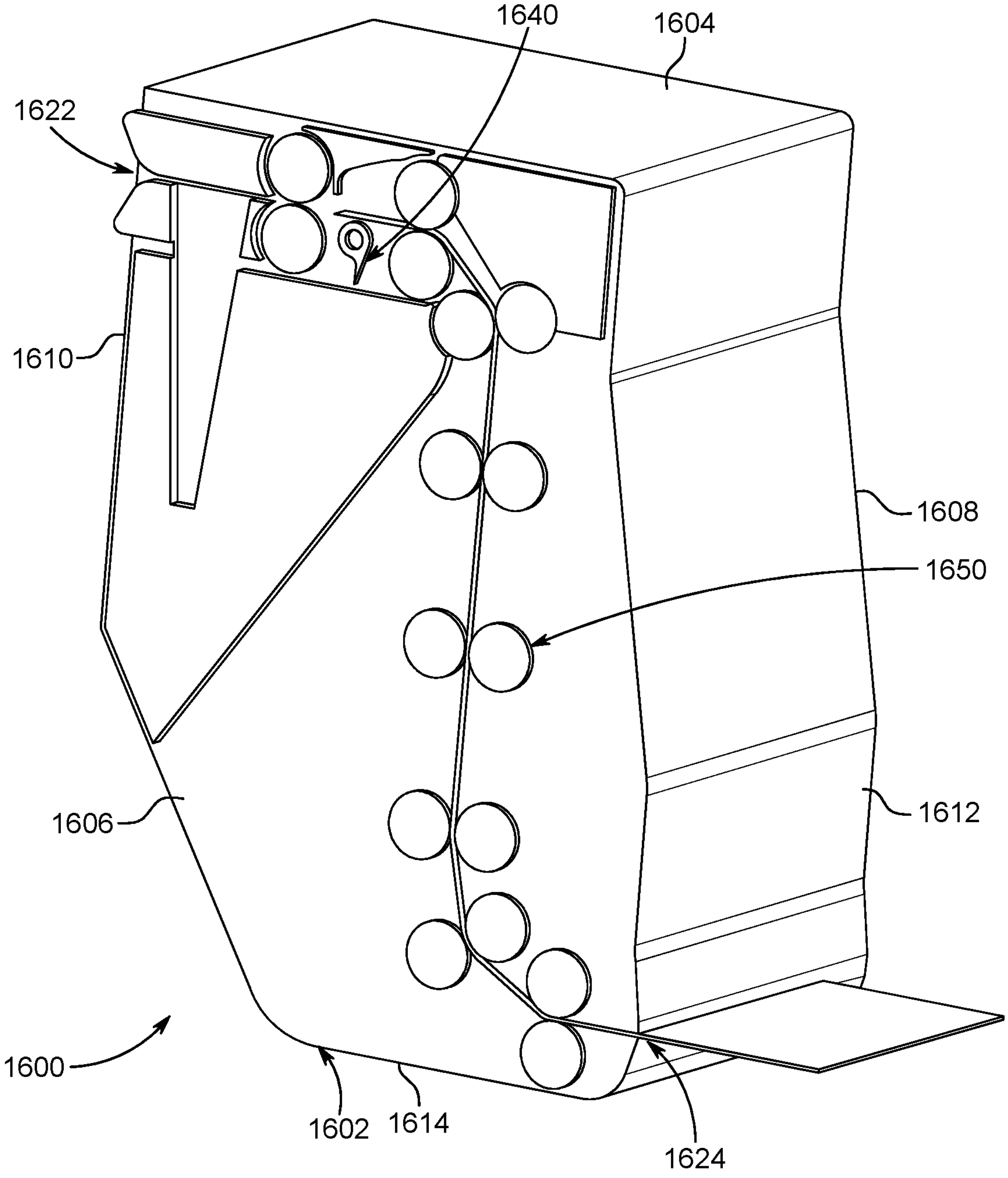
FIG. 5 is an enlarged side perspective view of a movable ticket burster of an alternative embodiment of an instant lottery ticket vending machine of the present disclosure.
Figure 6:
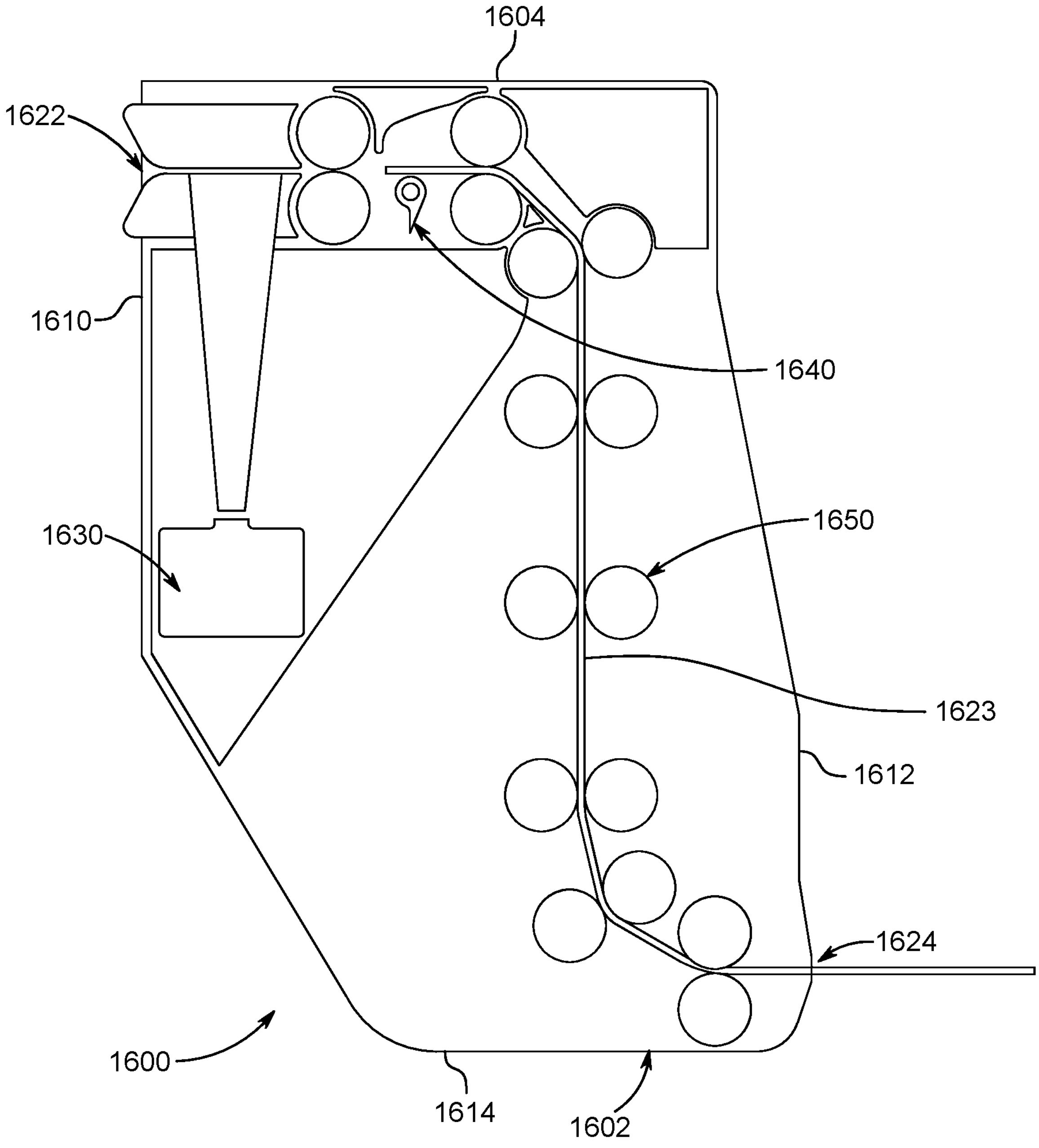
FIG. 6 is an enlarged side view of the movable ticket burster of FIG. 5.

Turning now to FIGS. 5 and 6, an alternative ticket burster of an alternative instant lottery ticket vending machine of another embodiment of the present disclosure is generally illustrated. In this example embodiment, like the above described ticket burster 600, this ticket burster 1600 generally includes: (a) a burster housing 1602; (b) one or more burster supporter connecters (not shown) connecting the burster housing 1602 to the burster supporter; (c) a code reader 1630 (such as a compact image sensor or barcode reader) supported by the burster housing 1602; (d) a ticket cutter 1640 supported by the burster housing 1602; (e) a plurality of ticket engagers 1650 supported by the burster housing 1602; and (f) a burster controller (not shown). In this example, the burster housing 1602 generally includes a top member 1604, spaced-apart side members 1606 and 1608, an inner member 1610, an outer member 1612, and a bottom member 1614. The burster housing 1602 also includes a plurality of internal members (not individually labeled) that define a ticket inlet 1622 through which the ticket burster 1600 is configured to receive an instant lottery ticket from a ticket pack drawer, a ticket outlet 1624 through which the ticket burster 1600 is configured to dispense the received instant lottery ticket into a suitable slot or tray (not shown) instead of to a ticket receptacle like ticket receptacle 400, and a ticket movement path 1623 extending from the ticket inlet 1622 to the ticket outlet 1624 and through which the instant lottery ticket is moved through the ticket burster 1600. The burster housing 1602 and particularly the inner member 1610 thereof can define an opening for or part of the ticket inlet 1622. The burster housing 1602 and particularly the outer member 1612 thereof can define an opening for or part of the ticket outlet 1624. Thus, in this alternative embodiment, the ticket movement path is different, the ticket engagers are differently arranged, the ticket outlet is in a different position, and the ticket burster dispenses the instant lottery tickets in a different direction.

Figure 7:
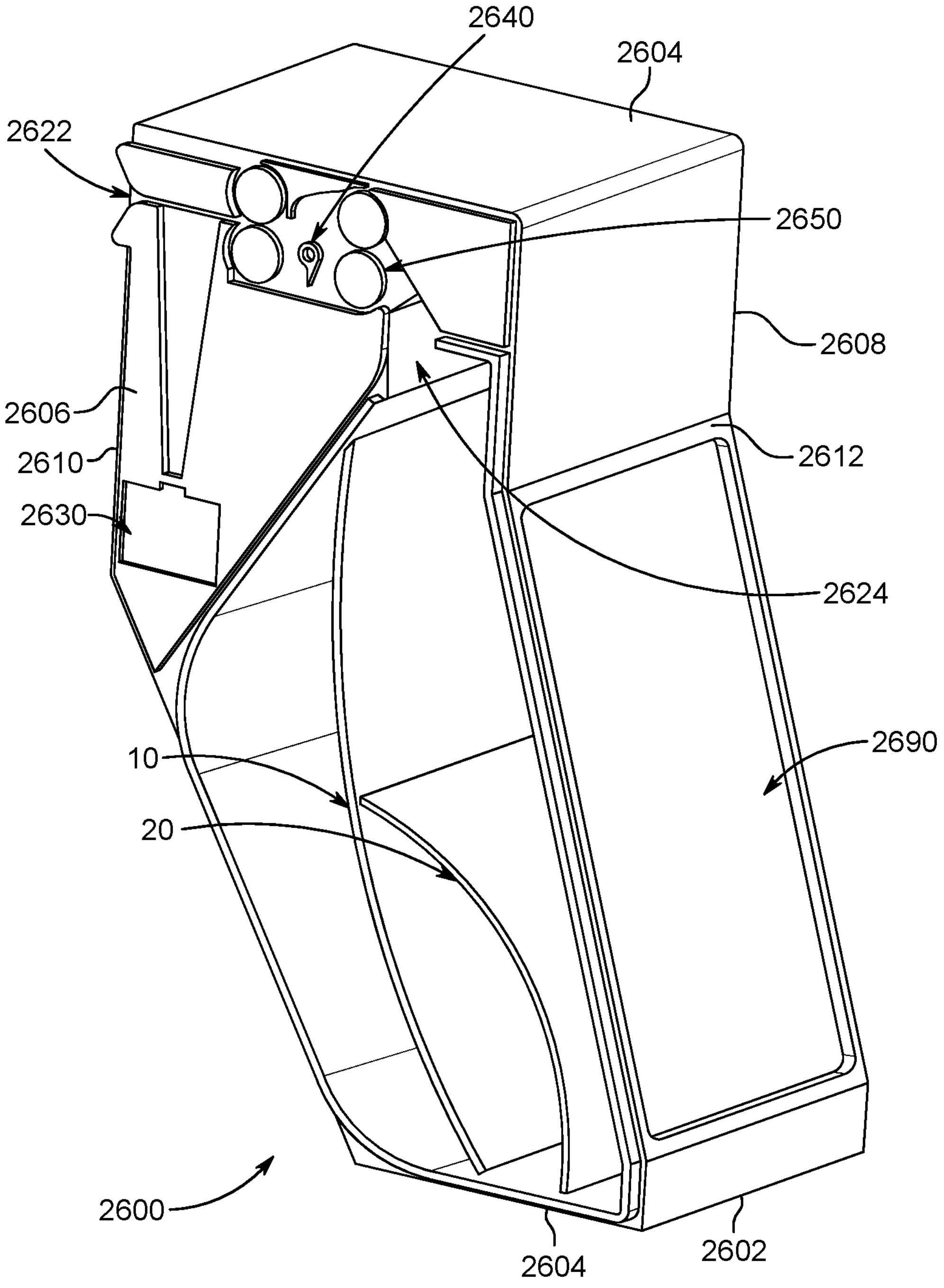
FIG. 7 is an enlarged side perspective view of another movable ticket burster of another alternative embodiment of an instant lottery ticket vending machine of the present disclosure.
Figure 8:
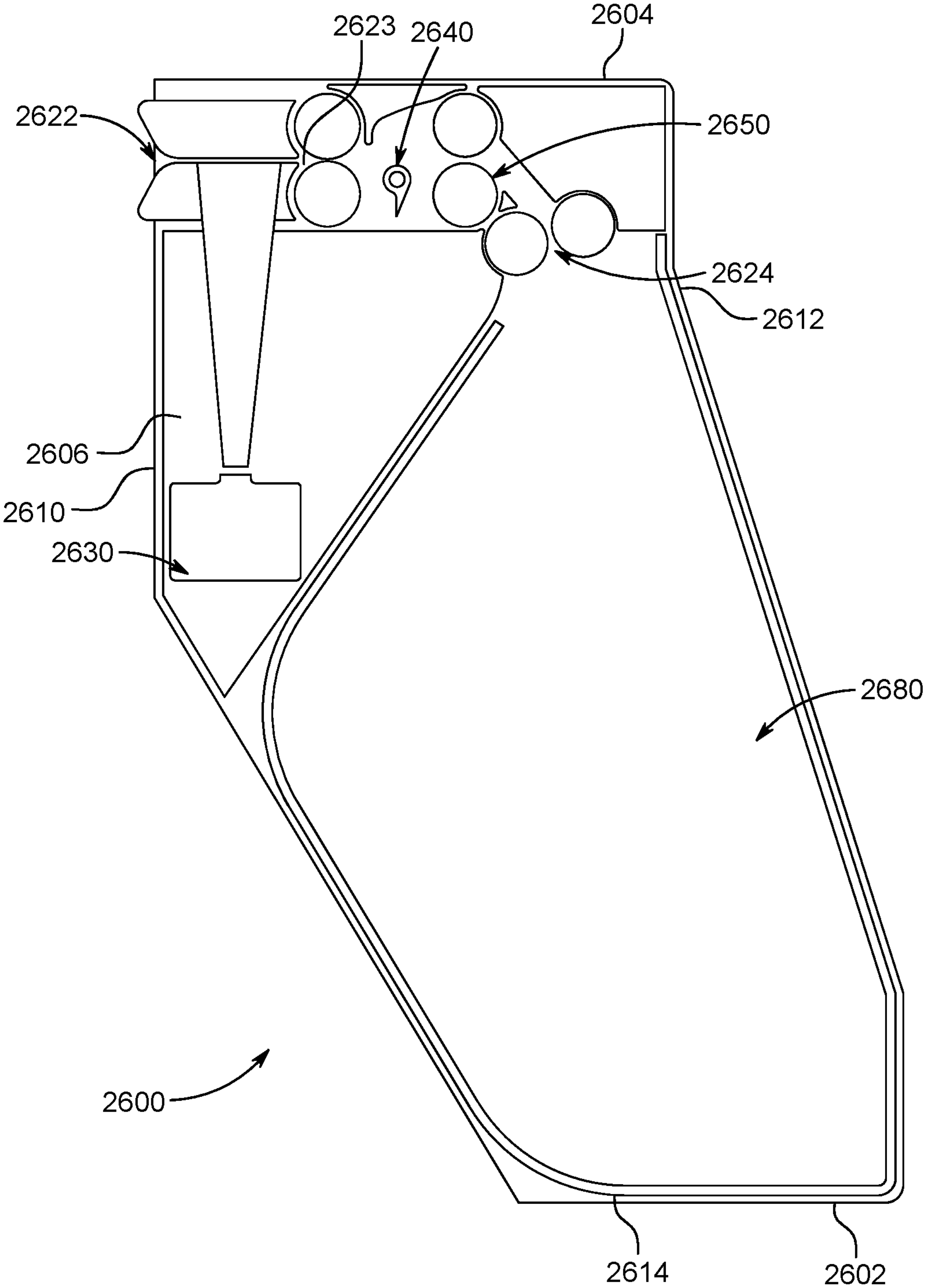
FIG. 8 is an enlarged side view of the movable ticket burster of FIG. 7.

Turning now to FIGS. 7 and 8, another alternative ticket burster of an alternative instant lottery ticket vending machine of another embodiment of the present disclosure is generally illustrated. In this example embodiment, like the above described ticket burster 600, this ticket burster 2600 generally includes: (a) a burster housing 2602; (b) one or more burster supporter connecters (not shown) connecting the burster housing 2602 to the burster supporter; (c) a code reader 2630 (such as a compact image sensor or a barcode reader) supported by the burster housing 2602; (d) a ticket cutter 2640 supported by the burster housing 2602; (e) a plurality of ticket engagers 2650 supported by the burster housing 2602; and (f) a burster controller (not shown). In this example, the burster housing 2602 generally includes a top member 2604, spaced-apart side members 2606 and 2608, an inner member 2610, an outer member 2612, and a bottom member 2614. The burster housing 2602 also includes a plurality of internal members (not individually labeled) that define a ticket inlet 2623 through which the ticket burster 2600 is configured to receive an instant lottery ticket from a ticket pack drawer, a ticket outlet 2624 through which the ticket burster 1600 is configured to dispense the received instant lottery ticket into a suitable ticket holding area 2680 in the burster housing 2602, and a ticket movement path 2623 extending from the ticket inlet 2622 to the ticket outlet 2624 and through which the instant lottery ticket is moved partially through the ticket burster 2600. The burster housing 2602 and particularly the inner member 2610 thereof can define an opening for or part of the ticket inlet 2622. The burster housing 2602 and particularly the outer member 2612 thereof can define an opening 2690 for enabling access to the ticket holding area 2680. Thus, in this alternative embodiment, the ticket movement path is different, the ticket engagers are differently arranged, the ticket outlet is in a different position, and the ticket burster first dispenses the instant lottery tickets (such as instant lottery tickets 10 and 20) into the ticket holding area 2680. In this example embodiment, after one, a plurality, or all of the purchased instant lottery tickets are collected or dispensed into the ticket holding area 2680, the ticket burster 2600 can be moved to a retrieval location that enables the purchaser to access and remove the purchased instant lottery tickets (such as the tickets 10 and 20) from the ticket holding area 2680 in the ticket burster 2600. In such embodiments, the front door (not shown) of this ticket vending machine can have a suitable opening that is aligned with the opening 2690 of the ticket burster 2600 (i.e., the ticket burster 2600 can be moved into a ticket dispense position such that the opening 2690 is aligned with such opening in the front door).

Figure 9:
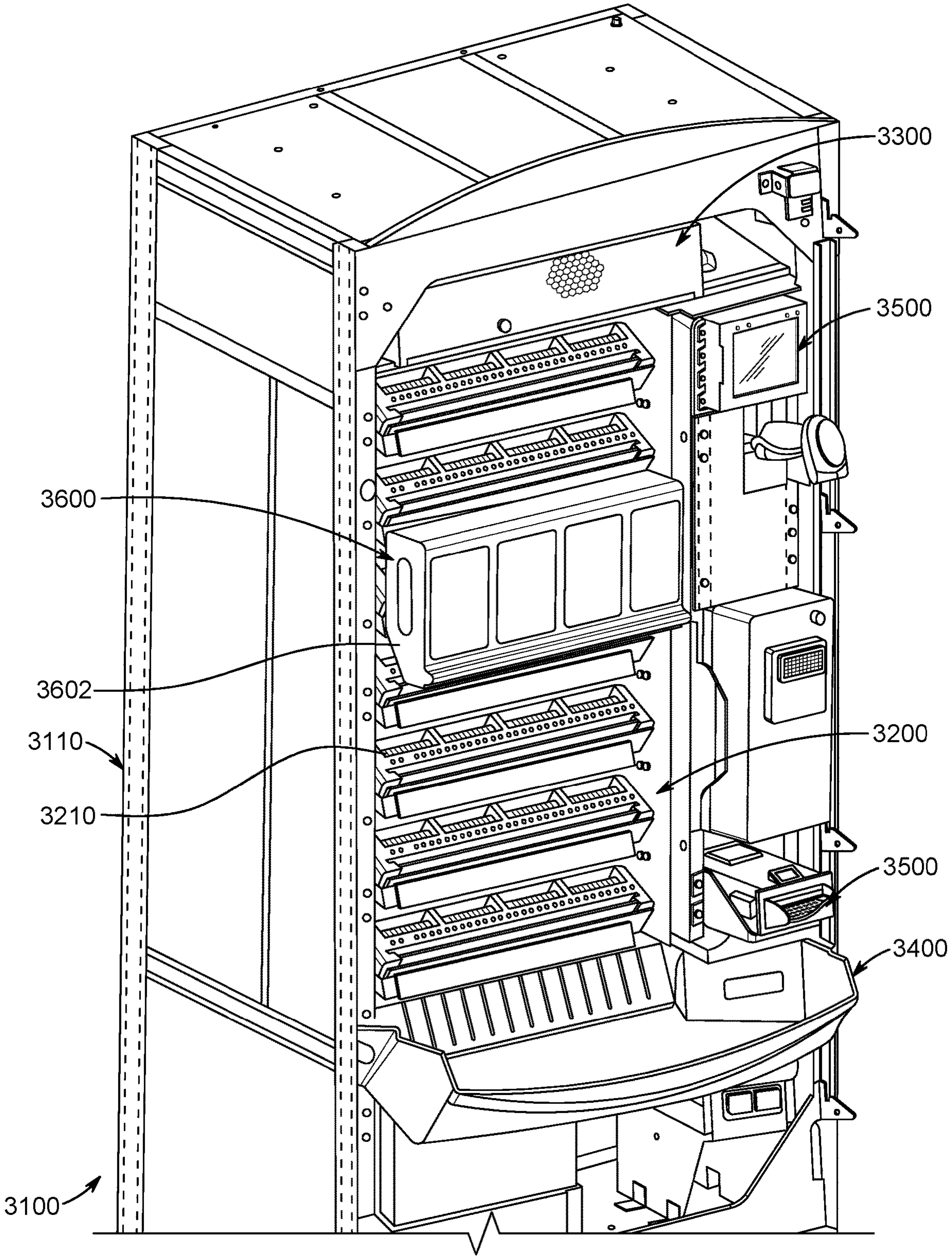
FIG. 9 is a fragmentary front perspective view of part of an instant lottery ticket vending machine of another example embodiment of the present disclosure shown with a front door and a ticket burster support removed, and showing a further alternative movable ticket burster of this example instant lottery ticket vending machine.
Figure 10:
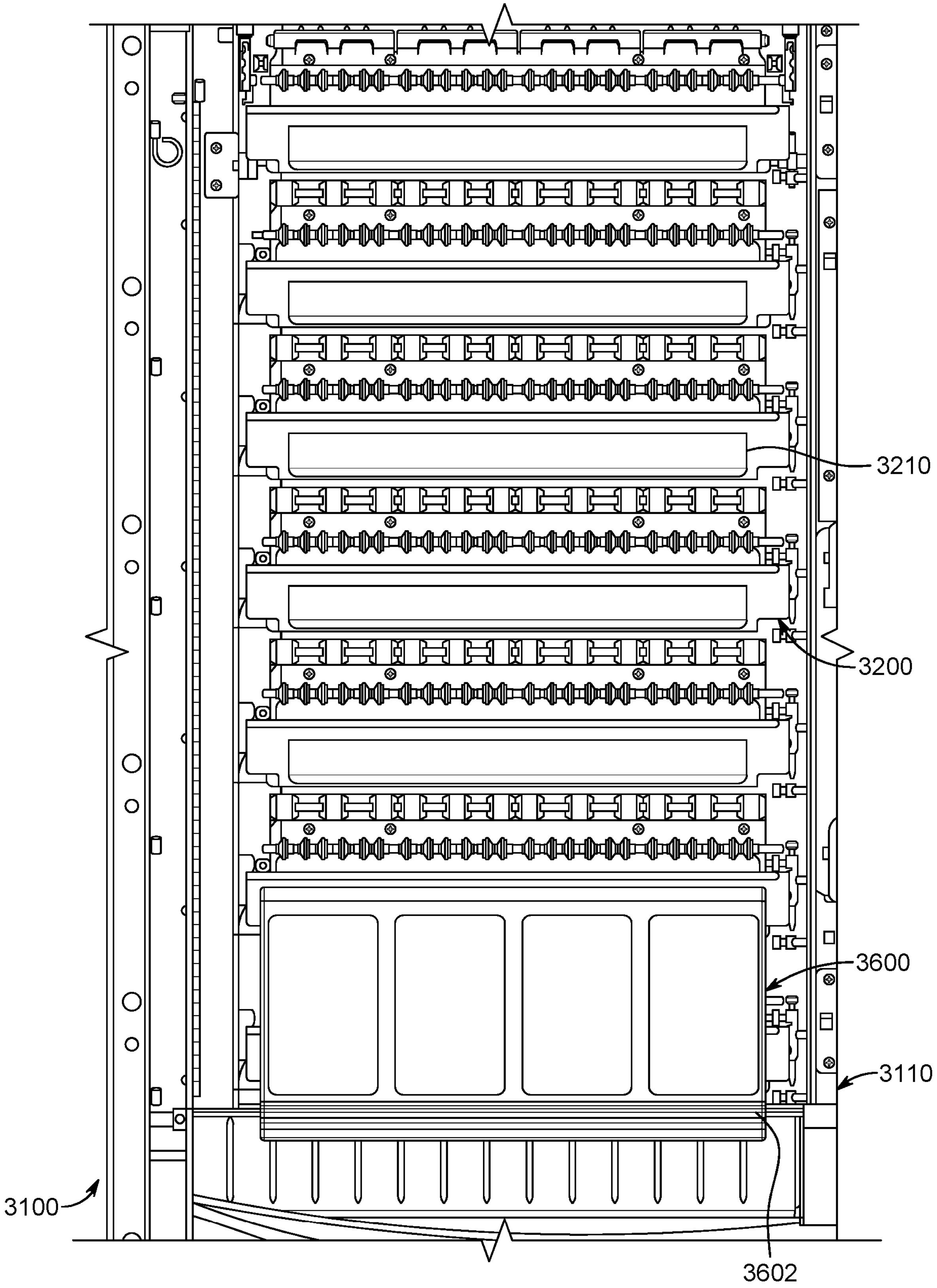
FIG. 10 is a fragmentary front view of part of the instant lottery ticket vending machine of FIG. 9 shown with the front door and the ticket burster support removed, and showing a movable ticket burster of this example instant lottery ticket vending machine.
Figure 11:
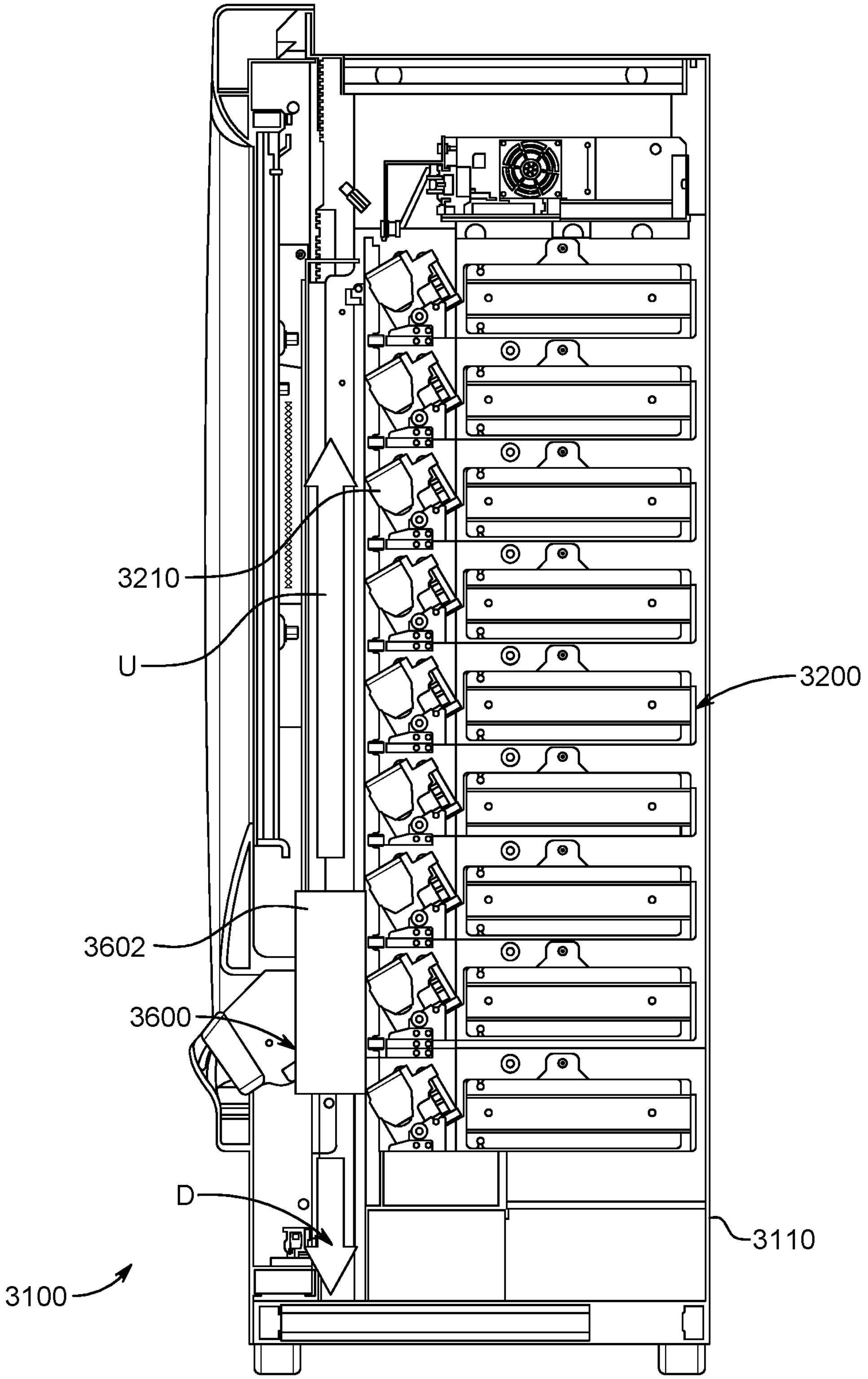
FIG. 11 is a fragmentary side view of part of the instant lottery ticket vending machine of FIG. 9 shown with the front door and the ticket burster support removed, and showing the movable ticket burster of this example instant lottery ticket vending machine.

Turning now to FIGS. 9, 10, and 11, an alternative ticket burster of an alternative instant lottery ticket vending machine of another embodiment of the present disclosure is generally illustrated. In this example embodiment, like the instant lottery ticket vending machine 100 described above, the ticket vending machine 3100 includes: (a) a machine housing 3110; (b) a ticket pack holder 3200 positioned in and supported by the machine housing 2110; (c) various electronic components (not shown) some of which are contained in an electronic component holder 3300 positioned in and supported by the machine housing 3110; (d) a ticket receptacle 3400 positioned in and supported by the machine housing 3110; (e) various purchaser interface components 3500 (not individually labeled) positioned in and supported by the machine housing 110; and (f) a movable ticket burster 3600 positioned in the machine housing 3110 and supported by a burster supporter (not shown) positioned in and supported by the machine housing 3110. It should be appreciated that the ticket vending machine 3100 will include various other components that are conventional in the industry and/or that would be readily apparent to those of ordinary skill in the art, but that are not described herein for brevity. This example embodiment includes a ticket burster assembly 3600 including a row or set of multiple connected ticket bursters that share a common housing 3602. The individual ticket bursters of the ticket burster assembly 3600 can be otherwise similar or identical to ticket burster 600 described above (or alternatively similar or identical to ticket burster 1600 or ticket burster 2600 described above). In this embodiment, the actuators (not shown) are configured to move the ticket burster assembly 3600 under the control of the controller in the vertical (e.g., up and down) directions as generally indicated by the arrows U and D in FIG. 11. In this example embodiment, the ticket burster assembly 3600 can simultaneously receive, obtain, and dispense instant lottery tickets from multiple ticket pack drawers (such as drawer 3210) that are in a single row.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. An instant lottery ticket vending machine comprising:

a machine housing;

a ticket pack holder positioned in the machine housing, the ticket pack holder comprising a plurality of ticket pack drawers, each of the ticket pack drawers configured to hold a pack of instant lottery tickets;

a ticket receptacle supported by the machine housing; and a ticket burster positioned in the machine housing, the ticket burster movable to a plurality of different ticket receipt positions, each different ticket receipt position associated with and in alignment with a different one of the ticket pack drawers, wherein each of the ticket pack drawers is configured to: feed an instant lottery ticket from that ticket pack drawer and a next instant lottery ticket held by that ticket pack drawer into the ticket burster after the ticket burster is moved into the ticket receipt position associated with that ticket pack drawer, and withdraw the next instant lottery ticket held by that ticket pack drawer from the ticket burster after the ticket burster separates that instant lottery ticket from the next instant lottery ticket, and wherein in each ticket receipt position the ticket burster is configured to: receive from the ticket pack drawer associated with that ticket receipt position the instant lottery ticket attached to the next instant lottery ticket, separate the instant lottery ticket from the next instant lottery ticket, and dispense the instant lottery ticket into the ticket receptacle.

2. The instant lottery ticket vending machine of claim 1, wherein the ticket burster is moveable horizontally and vertically.

3. The instant lottery ticket vending machine of claim 1, wherein the ticket burster is additionally movable to a ticket dispense position adjacent to the ticket receptacle.

4. The instant lottery ticket vending machine of claim 1, wherein the ticket burster comprises a burster housing that defines a ticket inlet, a ticket outlet, and a ticket movement path extending from the ticket inlet to the ticket outlet.

5. The instant lottery ticket vending machine of claim 1, wherein the ticket burster comprises a burster housing and a code reader supported by the burster housing.

6. The instant lottery ticket vending machine of claim 1, wherein the ticket burster comprises a burster housing defining a code reader support area, and a code reader positioned in the code reader support area.

7. The instant lottery ticket vending machine of claim 6, wherein the burster housing defines a code reader scan area extending from the code reader support area.

8. The instant lottery ticket vending machine of claim 7, wherein the code reader is positioned in the code reader support area and configured to emit light waves through the code reader scan area to read a code on each instant lottery ticket as that instant lottery ticket moves in a ticket movement path and through the code reader scan area.

9. The instant lottery ticket vending machine of claim 1, wherein the ticket burster comprises a burster housing and a ticket cutter supported by the burster housing.

10. The instant lottery ticket vending machine of claim 1, wherein the ticket burster is rotatable about a horizontal axis to separate each instant lottery ticket from the next instant lottery ticket attached thereto.

11. The instant lottery ticket vending machine of claim 1, wherein the ticket burster is a first ticket burster, and which comprises a second ticket burster positioned in the machine housing, the second ticket burster movable into the plurality of different ticket receipt positions, wherein in each ticket receipt position, the second ticket burster is configured to receive the instant lottery ticket attached to the next instant lottery ticket from the ticket pack drawer associated with that ticket receipt position, separate the instant lottery ticket from the next instant lottery ticket, and dispense the instant lottery ticket into the ticket receptacle.

12. An instant lottery ticket vending machine comprising:

a machine housing;

a ticket pack holder positioned in the machine housing, the ticket pack holder comprising a plurality of ticket pack drawers, each of the ticket pack drawers configured to hold a pack of instant lottery tickets; and a ticket burster positioned in the machine housing, the ticket burster comprising a burster housing that defines a ticket inlet, a ticket outlet, and a ticket movement path extending from the ticket inlet to the ticket outlet, the ticket burster movable to a plurality of different ticket receipt positions, each different ticket receipt position associated with and in alignment with a different one of the ticket pack drawers, wherein in each ticket receipt position, the ticket inlet of the burster housing is configured to receive from the ticket pack drawer associated with that ticket receipt position an instant lottery ticket that is attached to a next instant lottery ticket, wherein the ticket burster is configured to separate the instant lottery ticket from the next instant lottery ticket and dispense the instant lottery ticket through the ticket outlet, and wherein the ticket burster is rotatable about a horizontal axis to separate each instant lottery ticket from the next instant lottery ticket attached thereto.

13. The instant lottery ticket vending machine of claim 12, wherein the ticket burster is moveable horizontally and vertically.

14. The instant lottery ticket vending machine of claim 12, wherein the ticket burster comprises a code reader supported by the burster housing.

15. The instant lottery ticket vending machine of claim 12, wherein the ticket burster comprises a ticket cutter supported by the burster housing.

16. An instant lottery ticket vending machine comprising:

a machine housing;

a ticket pack holder positioned in the machine housing, the ticket pack holder comprising a plurality of ticket pack drawers, each of the ticket pack drawers configured to hold a pack of instant lottery tickets; and a ticket burster positioned in the machine housing, the ticket burster comprising a burster housing that defines a code reader scan area, the ticket burster movable to a plurality of different ticket receipt positions, each different ticket receipt position associated with and in alignment with a different one of the ticket pack drawers, wherein in each ticket receipt position, the burster housing is configured to receive from the ticket pack drawer associated with that ticket receipt position an instant lottery ticket and part of a next instant lottery ticket that is attached to the instant lottery ticket, wherein the ticket burster comprises a code reader configured to emit light waves to read a code on each instant lottery ticket as that instant lottery ticket moves through the code reader scan area, wherein the ticket burster is configured to separate the instant lottery ticket from the next instant lottery ticket and dispense the instant lottery ticket through the ticket outlet, wherein the ticket burster is configured to enable the next instant lottery ticket after being separated from the instant lottery ticket to be moved back into the ticket pack drawer.

17. The instant lottery ticket vending machine of claim 16, wherein the ticket burster comprises a ticket cutter supported by the burster housing.

* * * * *